Nov. 7, 1961
A. RONNING
3,007,740
VEHICLE WHEEL
Original Filed Jan. 19, 1955
2 Sheets-Sheet 1
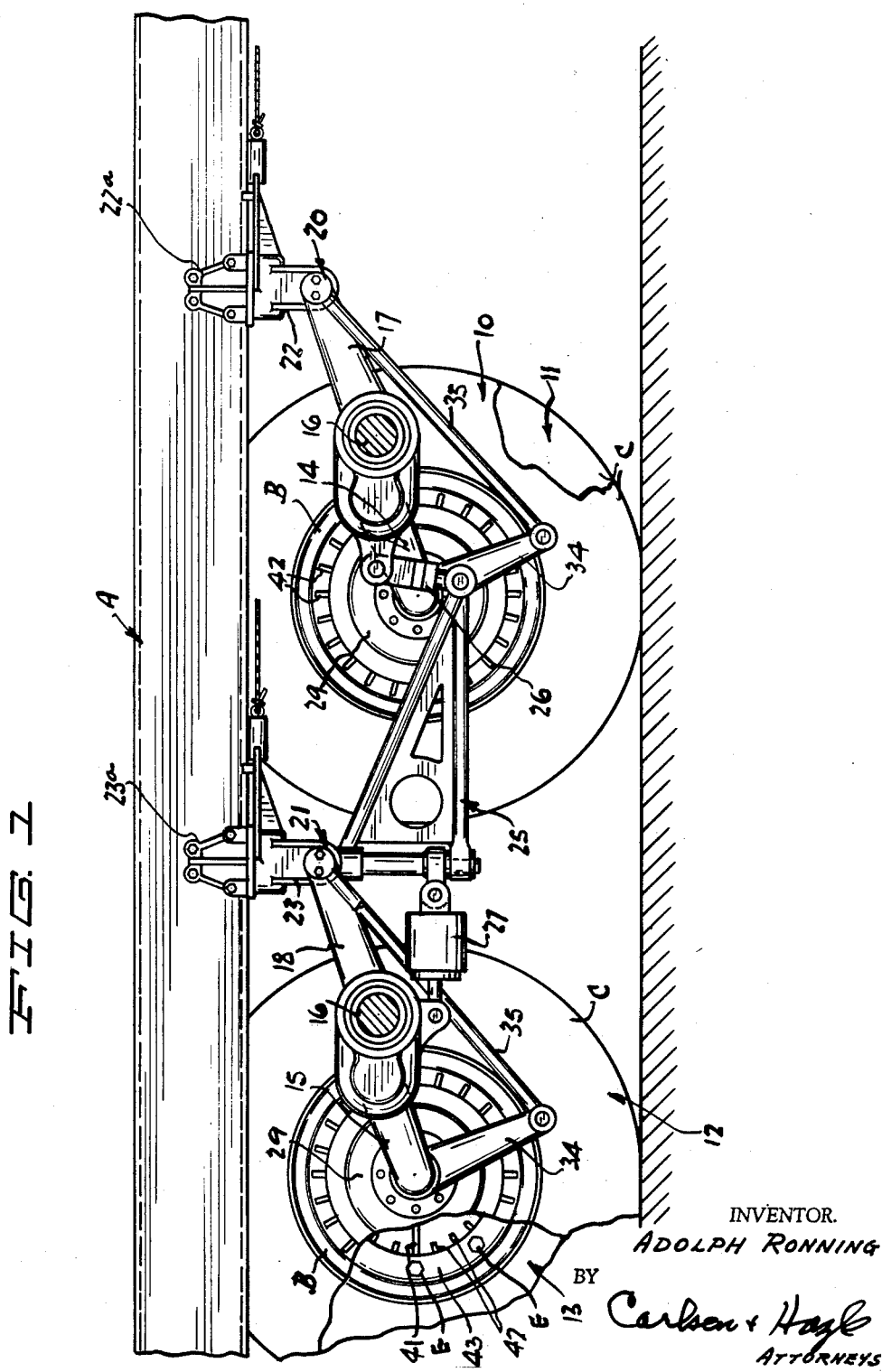
INVENTOR.
ADOLPH RONNING
BY
Carlsen + Hagle
ATTORNEYS Nov. 7, 1961 A. RONNING 3,007,740
VEHICLE WHEEL
Original Filed Jan. 19, 1955 2 Sheets-Sheet 2
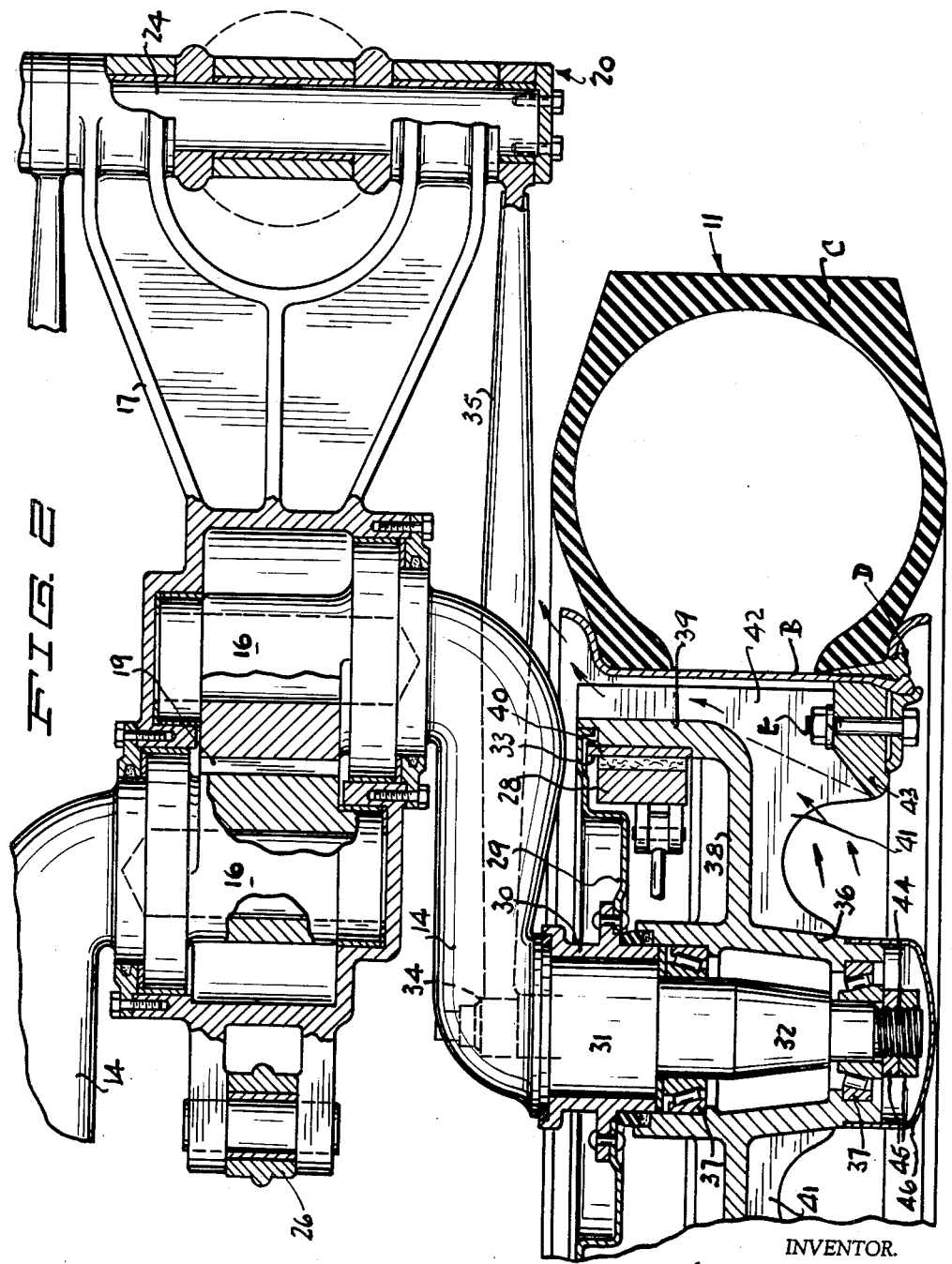
INVENTOR.
ADOLPH RONNING
BY
Carlsen Hoyle
ATTORNEYS United States Patent Office 3,007,740
Patented Nov. 7, 1961

3,007,740
VEHICLE WHEEL
Adolph Ronning, 4826 E. Weldon Ave., Phoenix, Ariz.
Original application Jan. 19, 1955, Ser. No. 482,831, now Patent No. 2,842,377, dated July 8, 1958. Divided and this application May 7, 1958, Ser. No. 733,732
10 Claims. (Cl. 301—6)

This invention relates generally to improvements in vehicle wheels and is a division from my copending application Serial No. 482,831, filed January 19, 1955, for Vehicle Suspension Having Differentially Connected Wheels, now U.S. Patent No. 2,842,377, issued July 8, 1958.

In the interests of maintaining continuity between the parent and this divisional application I have disclosed the wheel construction forming the basis of the present application in association with the tandem and differentially connected wheels of the suspension as it is set forth in the parent application, but this is not to be regarded as imposing a limitation and my improved wheel construction may be used in other types of vehicle suspensions wherever suitable. Considerable difficulty has arisen in the past in properly cooling the brakes with which wheels of high speed or over the road type of vehicles are provided, and this is particularly true because of the increase in vehicle weight and the increase in the speed with which they are operated in modern times. These brakes are located within the pneumatic tires which surround the wheels so that ventilation is not at all good in most instances, and this factor also has complicated the problem of proper heat dissipation when the brakes are applied for any length of time or when the brakes are applied heavily in the case of making a so-called panic stop.

It is the primary object of my invention to provide an improved wheel construction having provision for centrifugally pumping air from the center of the wheels outwardly and then across the surfaces of the brake drums in wiping and heat exchanging relation with the latter, so that the cooling of the brakes becomes a minor problem. As a further object of my invention I contemplate the manufacture of the brake drum and its associated hub along with a series of radially extending but circumferentially spaced apart fins, all from aluminum or other desired material and preferably, although not necessarily in one monolithic structure or casting, in order thus to reduce the weight of the wheel and also to obtain the benefits of the rapid heat dissipation characteristic of aluminum and similar materials. In most instances the brakes are of the internal expanding type located within the brake drum and in order to provide for the necessary life wear a cast iron or other suitable metallic band is bonded to the interior of the drum in molecular contact with the wall of the drum in order to provide for the maximum heat transfer in an outward or radial direction.

Still another object of my invention is to provide a wheel structure of the kind specified supra, in which a substantial annular chamber or pocket is provided about the periphery of the brake drum but closed off by a surrounding outer wall element, which may be the rim for mounting and supporting the tire. Such outward enclosure of this annular recess prevents the unwanted outward escape of the air under the influence of centrifugal force, which force will then have an opportunity to build up a higher pressure and force more air directly into contact with the drum and across the same where the maximum cooling effect is desired. Furthermore, this annular air chamber is at least partially enclosed by a ring-like element extending inwardly at one side, preferably the outside of the wheel, and from the aforesaid outer wall element and which ring-like element may constitute a part of the wheel structure, per se, and also function to mount the said wall element where the same constitutes the rim of the tire. In either event this ring-like element will provide a further enclosure for the annular air chamber, ensuring that the air will be directed properly across the outer peripheral surface of the brake drum.

These and other more detailed and specific objects will be disclosed in the course of the following specification, reference being had to the accompanying drawings, in which:

FIG. 1 is a side elevation of a wheel suspension according to the parent application and with all but a portion of the near front wheel being omitted entirely in order to disclose the structure to better advantage. This view is substantially identical to FIG. 2 of the parent application.

FIG. 2 is an enlarged and fragmentary horizontal, sectional and plan view like FIG. 3 of the parent application and in particular showing my improved wheel structure in diametrical section.

In many respects the wheel suspension as it appears in FIG. 1 is similar to that shown in my prior Patent No. 2,612,387, issued September 30, 1952, and to which attention is invited for comparative purposes. Essentially the wheel suspension comprises for each side of the vehicle a pair of relatively closed spaced, tandem-arranged front and rear wheels differentially connected for relative upward and downward swinging movements and also for movements as a unit about relatively forwardly located points of pivot suspension to the frame A of the vehicle. A walking-beam type of connection is then made between such front and rear wheel assemblies so that as either assembly moves upwardly the other will be moved downwardly by a corresponding amount. Thus not only is there individual compensating movements between the component wheels of each wheel pair, but there is a further compensating movement between the front and rear wheel pairs, with the result that load forces will be transmitted equally to all of the wheels and there will result a minimum of vertical deflection or acceleration of the vehicle frame as the wheels travel over irregular surfaces even at very high speeds. In FIG. 1 the innermost front wheel is designated at 10, while a portion of the outermost wheel of the front pair is designated generally at 11 and the corresponding wheels of the rear pair are indicated generally at 12 and 13 respectively. The wheels are mounted for rotation about the outwardly extending journals of relatively short cranked axles, designated at 14 for the front wheel pair and at 15 for the rear wheel pair, and at their forward ends these cranked axles are provided with parallel, inwardly projecting journals denoted throughout at 16 which are mounted for oscillation about generally transverse and horizontal axes in bearings in the rear end portions of housings or mounting members, designated at 17 and 18 respectively for the front and rear assemblies. Within said housing members 17 the journals 16 of the cranked axles are provided with meshing teeth, as seen at 19 in FIG. 2, so that swinging movement of either of the cranked axles of each pair in one direction will be accompanied by an exactly equal but opposite movements of the other axle of the pair, bringing about the aforesaid differential compensation between the individual wheels.

The forward ends of the housing members 17—18 are pivoted upon horizontal and transverse axes at the points 20—21 to brackets 22—23 the upper portions of which, designated at 22ᵃ and 23ᵃ respectively, are secured to the frame A of the vehicle as seen in FIG. 1. In the parent application there is disclosed means whereby the lower portions 22—23 of the brackets may swivel about upright axes in order to permit the front and rear wheel assemblies to caster or to facilitate the accurate alignment of these wheels with the frame of the vehicle, but since this feature is not material to an understanding of the present invention it is not detailed herein. It might be noted, however, as seen in FIG. 2, that the forward ends of the housing members 17—18 are bifurcated to provide relatively widespread bearing contact with pins, one of which is seen at 24, carried by the aforesaid brackets so that the wheel assemblies will have good lateral stability.

As has also been stated hereinbefore the front and rear wheel assemblies at each side are connected by longitudinally extending walking beam elements, one of which is designated generally at 25 in FIG. 1, so that there will be a compensating action between said front and rear wheel assemblies. At its forward end this walking beam element is connected by means of a pivoted link 26 to the rear end of the forward housing member 17 while at its rear end there is a longitudinally elastic connection 27 to a lower portion of the rear housing member 18. The walking beam element as a whole pivots about the aforesaid rear pivot point 21 and because of the longitudinal elasticity of the part 27 the load forces will be transmitted to the wheels and the tendency of the wheels to swing upwardly will be spring resisted, thus forming a convenient and extremely compact spring suspension between the frame A and the wheels. In addition the walking beam element 25 is shown in FIG. 1 as constructed to permit relative flexing of its parts in a horizontal transverse direction as would be necessary during castering movements of the wheel assemblies but I may, of course, dispense with this entire structure in favor of that shown in my Patent No. 2,612,387 without departing in any way from the scope of the present invention.

The brake mechanism for each of the wheels 10 through 13, as best appears in FIG. 2, comprises the conventional brake shoes, one of which appears in section at 28, and which are as usual carried by a backing plate 29. In accordance with the invention as set forth in the parent application the backing plate 29 is provided with a bearing collar 30 by which it is journaled for restricted rotation upon a bearing portion 31 of the outwardly extending wheel mounting spindle 32 of the associated cranked axle. The application of the brake shoes 28 to the braking surface 33 on the wheel will, of course, tend to cause the shoes and the associated backing plate to rotate with the wheel and the brake torque reaction is removed from the axis of rotation of the wheels by the provision of cranks 34 upon each backing plate (or preferably as an extension of the bearing collar 30) and the connection between these cranks and the pivot points 20—21 aforesaid of the brake torque reaction links, indicated at 35. Thus the brake torque reaction is transmitted directly to the vehicle frame with the advantages set forth in detail in the prior application.

Turning now to a description of the wheel structure which constitutes the presently claimed invention each comprises a hub 36 mounted by means of anti-friction bearings 37 upon the spindle 32, with the hub formed integrally or otherwise operatively associated with an outwardly projecting circular wall 38 from which there is turned, in an inward direction, an annular brake drum 39. In the interests of both lightness and rapid heat conduction these and related portions of the wheel structure are preferably formed or cast integrally from aluminum although other material may, of course, be used. Where the material is soft such as aluminum the braking surface 33 aforesaid is formed on the inside of an annular lining band 40 bonded to the inside of the brake drum 39 and made of some such material as iron. The bonding of iron to aluminum is possible by modern methods of manufacture and when properly done the materials are in molecular contact so that rapid heat dissipation will take place from the brake shoes and the lining band 40 outward through the braking drum 39. Also formed integrally with the hub 36 and the circular wall 38, or otherwise operatively associated therewith, is a plurality of radially extending and circumferentially spaced apart fins 41 and these fins project outwardly beyond the periphery of the brake drum 39 to which they are also attached. Preferably there are also a number of intervening, outwardly disposed and radially extending fins which appear at 42. Joining all of the fins 41—42 at the outside of the wheel is an annular element or ring 43 which extends inwardly and as here shown provides a support for a rim B by which the conventional pneumatic tire C is mounted upon the wheel. A conventional tire mounting assembly is designated generally at D and is held in place by bolts E located in spaced positions around said annular member 43 and which bolts must, of course, be removed in removing the tire from the wheel.

The outer extremity of the spindle 32 for each wheel is threaded, as designated at 44, for the accommodation of lock nuts 45 holding the outermost bearing 37 in place and mounting the entire wheel assembly upon the spindle, there being a dust cover 46 as usual over this wheel mounting structure.

All of the fins 41—42, because of their radial locations, cooperate to serve as a blower or fan as the wheel rotates to centrifugally force air outwardly in the direction of the arrows in FIG. 2. Inasmuch as the air cannot escape in an outward direction because the rim B constitutes an outer circular or annular wall preventing this, the air is constrained to flow inwardly over the brake drum 39 in wiping, heat exchanging relation therewith. Thus the maximum of cooling effect is achieved and as stated this cooling effect will be enhanced if a material such as aluminum or one having the heat dissipating characteristics thereof is used in the construction of the wheel. In addition to the confinement of the outwardly moving air by the wall constituted by the rim B which enables the centrifugal force to build up the pressure of the air beyond that which would otherwise be possible and thus increase cooling efficiency, the escape of air in the unwanted outward direction from the wheel is substantially prevented by the annular member 43 as will be clearly evident from a study of FIG. 2 and this is an important feature also of the present invention.

As has been stated hereinbefore the wheel structure here just described and as will later be claimed is useful in applications other than the differentially compensating type of wheel suspension disclosed in the parent application and my related prior patents and I do not intend in any way to restrict myself to usage with such suspensions of my improved wheel structure.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a vehicle, a wheel cast in one piece of light weight material and having a central hub and brake drum, the said drum having an annular wall and a brake drum lining band of heavier material bonded to the inside of said wall in molecular contact therewith, a tire mounting rim assembly arranged around and spaced outwardly from the brake drum wall, a series of radial fins cast with the hub and brake drum and supporting the said rim assembly while serving also as fan blades to blow air over the brake drum within said rim assembly and in heat exchanging relation to the drum for dissipating heat generated therein, and a heavy ring cast on outer ends of said fins for supporting the said rim assembly, said ring extending inwardly and having an inside diameter less than the outside diameter of the drum.

2. A vehicle wheel cast of aluminum and having a central hub and brake drum cast integrally therewith, the said drum having an annular wall and a brake drum lining band of cast iron bonded to the inside of said wall in molecular contact therewith, a tire mounting rim assembly arranged around and spaced outwardly from the brake drum wall, a series of radial fins cast with the hub and brake drum and forming the sole support of the said rim assembly while serving also as fan blades to blow air over the brake drum within said rim assembly and in heat exchanging relation to the drum for dissipating heat generated therein, means demountably supporting the said rim assembly on the said fins, and a series of auxiliary fins between the first mentioned fins and extending across the outside of the wall of the brake drum.

3. A vehicle wheel of the character described comprising a monolithic aluminum casting having a hub and a surrounding concentric brake drum, and a plurality of radially extending and circumferentially spaced fins joining the hub and brake drum, said fins extending radially outwardly beyond said drum, an outer ring-shaped wall element of larger outside diameter than the outside diameter of the drum but of smaller inside diameter than said outside diameter of the drum and carried by the outer ends of the fins so that an outwardly confined annular air space is defined between the drum and said wall element whereby the latter will resist the centrifugal expulsion of the air upon rotation of the wheel causing the air to pass over the brake drum in wiping heat exchanging relationship therewith.

4. In a vehicle wheel of the character described, said wheel having a side wall, a hub and a surrounding concentric brake drum, a plurality of radially extending and circumferentially spaced apart fins joining the hub and brake drum and extending radially outwardly beyond said drum, said side wall, hub, brake drum and fins being formed as one monolithic structure, an outer ring-shaped wall element and means mounting the same on the wheel outwardly of the drum and around the fins to form an outwardly confined annular air space between the drum and said wall element to prevent the centrifugal outward expulsion of the air upon rotation of the wheel and cause the air to pass between the fins and over the brake drum in wiping heat exchanging and heat dissipating relationship with the latter, and an annular element extending inwardly from the outer edge portion of said wall element along the axially outer edges of the fins to further confine the said air space and act upon the air passing outward radially between the fins and direct said air inwardly over the brake drum in a path substantially paralleling the axis of rotation of the wheel.

5. In a vehicle wheel of the character described, said wheel having a side wall, a hub and a surrounding concentric brake drum at one side of the wheel, a plurality of radially extending and circumferentially spaced apart fins joining the hub and brake drum and extending radially outwardly beyond said drum, said side wall, hub, brake drum and fins being formed as one monolithic structure, an outer ring-shaped wall element positioned outwardly of the drum and around the fins to form an outwardly confined annular air space between the drum and said wall element to resist the centrifugal expulsion of the air upon rotation of the wheel and cause the air to pass between the fins over the brake drum in wiping heat exchanging and heat dissipating relationship with the latter, and an annular element at the side of the wheel opposite the drum extending inwardly with respect to said wall element to further confine the said air space and direct the air over the drum, said annular element having an inside diameter less than the external diameter of the brake drum.

6. A vehicle wheel of the character described comprising a hub and an axially offset concentric brake drum, a plurality of radially extending and circumferentially spaced apart fins extending in a true radial direction and integrally joining the hub and brake drum at one side of the drum and at least a part of said fins continuing in said true radial direction and extending across the drum substantially parallel with the axis of the wheel and projecting radially outwardly beyond said drum, an outer annular wall element enclosing the outer ends of the latter fins and having a ring portion on the fin side of the drum extending inwardly beyond the plane of the outer circumference of the drum but in axially spaced relation thereto and forming an inwardly opening throat and an outwardly confined annular air space between the drum and said wall element to direct air at high velocity around and about the drum upon rotation thereof and cause the air to pass between the fins and over the brake drum in wiping heat exchanging relationship therewith.

7. The subject matter of claim 6 wherein said outwardly confined annular air space is equal to or greater in area than said inwardly opening throat in planes lying perpendicular to the wheel axis.

8. In a vehicle wheel having a central wheel unit comprising a circular side wall having a hub projecting outwardly from one side thereof and an annular brake drum projecting inwardly from the other side thereof with the hub and drum concentrically disposed and the latter having a substantially greater diameter, a plurality of circumferentially spaced cooling fins extending radially outward in a true radial direction from the drum, said side wall, said hub, said brake drum and said cooling fins being formed as one monolithic structure, an annular rim assembly mounted on said fins in radially spaced relation to said drum, means on the hub side of the side wall for moving air centrifugally outward therealong as the wheel is rotated about the hub axis, and means on the rim assembly extending inwardly toward the hub to a diameter less than the drum but substantially greater than the hub and in axially spaced relation to the wall for directing said centrifugally moved air axially into the space between the drum and rim assembly.

9. A vehicle wheel of the character described having a circular side wall with an annular brake drum formed around the periphery thereof and projecting to one side of the wall, a hub disposed concentrically with respect to the drum and projecting axially from the side wall on the side thereof opposite from the drum, a tire mounting rim assembly arranged around and spaced outwardly from the drum, means joining the drum and rim assembly leaving a circumferential axially extending passage therebetween, and annular means on the rim assembly projecting inwardly toward the hub projection in axially spaced relation to the side wall and forming an annular air inlet opening around the hub, means forming closed communication between said inlet opening and said axially extending passage whereby air entering the inlet opening around the hub will be centrifugally forced outwardly in radial directions along said side wall and then in an axial direction between the drum and rim assembly through said axial passage, said side wall being provided with a plurality of circumferentially spaced fins extending radially outward from the hub on the same side of the wall as said hub projection and extending into the space bewteen the wall and said annular means to assist said centrifugal movement of air, and said side wall, brake drum, and fins being integrally cast in a single unit to facilitate heat dissipation from the drum to the fins.

10. In a vehicle wheel of the character described, a circular side wall with an annular brake drum formed around the periphery thereof and having circumferentially spaced radial cooling fins extending over the side wall and outwardly beyond and axially over the perimeter of the brake drum, said wall, drum, and fins being integrally cast in a single unit to facilitate heat dissipation from the brake drum to the cooling fins, a hub disposed concentrically with respect to the brake drum, a tire mounting rim assembly arranged around and spaced outwardly from the drum, means joining the brake drum and said rim assembly leaving a circumferential axially extending air passage therebetween, annular means on the rim assembly projecting inwardly toward the wheel center in axially spaced relation to the side wall and forming an annular air inlet opening around the hub, and means forming closed communication between said inlet opening and said axially extending passage whereby air entering the inlet opening around the hub will be centrifugally forced outwardly in radial directions along said side wall and cooling fins and then in an axial direction between the brake drum and the tire mounting rim assembly through said axial passage.

References Cited in the file of this patent

UNITED STATES PATENTS

| | | |
|---|---|---|
| 1,727,486 | Sauzedde | Sept. 10, 1929 |
| 2,053,735 | Overholser | Sept. 8, 1936 |
| 2,274,503 | Reid | Feb. 24, 1942 |
| 2,740,502 | Butterfield | Apr. 3, 1956 |

FOREIGN PATENTS

| | | |
|---|---|---|
| 341,778 | Great Britain | Jan. 22, 1942 |